Patented June 1, 1943

2,320,673

UNITED STATES PATENT OFFICE 2,320,673

WELL TREATING FLUID

Troy J. Stewart, Great Bend, Kans., assignor to Leo Clark Morgan, Wichita, Kans.

No Drawing. Application August 3, 1940,
Serial No. 351,187

6 Claims. (Cl. 252—8.55)

The present invention relates to the treatment of wells with acids for the purpose of increasing the rate of production thereof, and has particular reference to the prevention of certain secondary precipitates during the period of such acid treatment.

The customary method of treating oil wells for the purpose of increasing the rate of production thereof involves the introduction of a charge of acid into the well, followed by the withdrawal of the spent acid after the treating fluid has eroded the acid-soluble earth formation adjacent the bore hole. By acid-soluble earth formation is meant the actual reservoir rock from which the oil is produced, as well as any secondary deposits of mud or the like which may be deposited adjacent to the bore hole or within the producing formation. In such acidizing treatments of the prior art, it has been discovered that harmful secondary reactions occur when the acid is neutralized in the calcareous formation. These secondary reactions result in part from impurities in the acid and limestone which give rise to precipitates and agglomerates which tend to clog the flow channels of the formation. Among these impurities in the acid and the limestone, sulfate ions and soluble iron compounds are perhaps the most objectionable. In addition to these impurities which result in the precipitation of calcium sulfate and basic ferric salts, the acid deflocculates the mud and other insoluble suspended material, with the result that the pores of the earth formation are clogged with such precipitates, thereby nullifying to a considerable extent the advantages derived from the acid treatment.

The problem created by the precipitation of calcium sulfate has been successfully solved by the addition of a calcium sequestering agent to the acid, as taught in Morgan Patent No. 2,128,-161. The precipitations of the iron may also be obviated in accordance with the invention disclosed in the co-pending application of Morgan and Stewart Serial No. 220,701, filed July 22, 1938, now Patent No. 2,227,860 dated January 7, 1941. It has also been proposed to prevent the precipitation of the mud and insoluble fines in the earth formation by the addition of a protective colloid, such as gelatin, to the well treating fluid, as disclosed in Morgan Patent No. 2,128,160.

The foregoing methods of combating secondary precipitation have greatly increased the effectiveness of the acid treatment of oil wells, particularly where prior acidizing techniques have been unsuccessful. There are, however, certain disadvantages attending the use of sodium hexametaphosphate, gelatin, and similar materials in hydrochloric acid, due to the fact that these reagents are relatively easily hydrolyzed, and this fact necessitates their addition to the acid solution just prior to the introduction of the treating fluid into the well.

An object of the present invention is to provide an improved well treating fluid of greater effectiveness and stability which obviates the disadvantages arising from the formation of secondary precipitates in the earth formation when the treating fluid has spent itself in the producing strata.

A further object is to provide an improved method of treating oil wells for the purpose of increasing the rate of production thereof which obviates the precipitation of mud and other insoluble fines in the pores and flow channels of the oil producing formation when the acid has spent itself therein.

A still further object is an improved well treating fluid containing a mud dispersing agent which is stable in the presence of relatively strong mineral acid.

Other objects will become apparent as the invention is hereinafter more fully described.

I have found that the foregoing and other advantages may be accomplished in accordance with the present invention, one aspect of which includes the addition to the well treating acid of a dispersing agent selected from the group consisting of the monovalent and bivalent metal salts of a sulphonic acid having the general formula

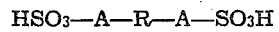

$$HSO_3—A—R—A—SO_3H$$

wherein A is a bivalent aromatic radical and R is a bivalent aliphatic radical. The monovalent salts are in general preferable because of their more ready solubility. However, under certain conditions the bivalent salts may be entirely satisfactory.

Compounds of the foregoing type may conveniently be prepared by condensing an aromatic sulphonic acid with an aliphatic aldehyde in the presence of a suitable catalyst such as a mineral acid, for example, sulfuric acid. The aromatic sulphonic acid may be derived from any of the well known aromatic hydrocarbons or substitution products thereof. I prefer, however, to employ the sulphonic acids derivable by sulphonation of naphthalene, benzene, phenol, naphthol, toluene, xylene, and the like. Any convenient aliphatic aldehyde may be employed where desired, but for economic reasons I prefer to employ formaldehyde, although it is apparent that the higher homologues thereof may be used if desired.

In order still more clearly to disclose the nature of the present invention, the preferred embodiment thereof will hereinafter be described in considerable detail. It should be clearly understood, however, that this is done solely by way of example and is not to be construed as a limitation upon the spirit and scope of the appended claims.

*Example*

25 grams of pure naphthalene is added to 40 grams of sulfuric acid (specific gravity 1.84), and the mixture is heated slowly with stirring until all of the naphthalene has dissolved and the temperature has attained 130° C. This heating period will not require in excess of 30 minutes. The resulting solution is then cooled to room temperature (approximately 25° C.), and 8 cc. of 37 per cent formaldehyde is added drop by drop to the solution, with constant agitation. The temperature during the addition of the formaldehyde should be kept below about 45° C. After being permitted to stand for a few minutes, the reaction mixture is poured into 150 cc. of water, and the resulting solution is then neutralized with lime. The calcium salt of the reaction product is soluble and remains in solution, whereas the calcium sulfate precipitated is filtered. The filtrate is evaporated to dryness on a steam bath, and the calcium salt of the reaction product is obtained as a light brown amorphous solid. The calcium salt itself may be employed as the mud dispersing agent, or the alkali metal salt may be produced therefrom, for example, by the addition of sodium or potassium sulfate to the solution in the proper proportions.

The compounds embraced within the class of substances represented by formula 1, supra, in general have no appreciable effect on the surface tension of hydrochloric acid solution, but when added to the extent of less than 1 per cent by weight to a 15 per cent hydrochloric acid treating solution, will prevent the precipitation of mud and insoluble fines in the pores of the producing formation.

If desired, calcium sequestering agents such as sodium hexametaphosphate may be added to the well treating fluid in cases where extreme calcium sulfate precipitation is encountered. Likewise, there may be added to the acid treating fluid suitable substances for effecting the sequestration of iron compounds, e. g., stannous chloride, polyhydroxybenzenes, as disclosed and claimed in the copending applications of Morgan and Stewart, Serial No. 220,701 (referred to above) and Serial No. 351,194, filed concurrently herewith. It will also be apparent that the customary corrosion inhibitors may also be incorporated in the well treating fluid where desirable.

In the foregoing detailed description it will be apparent that many variations may be made without departing from the spirit and scope of the invention. Thus, the temperatures and proportions given in the specific example may be varied within wide limits, as will be apparent to those skilled in the art. Many other variations in detail may be made where desired. I therefore intend to be restricted only in accordance with the prior art and the following patent claims.

I claim:

1. A well treating fluid comprising an acid capable of forming water soluble salts with the earth formation, said acid containing a compound selected from the group consisting of the monovalent and bivalent metal salts of a sulphonic acid having the formula

wherein A is a bivalent aromatic radical and R is a bivalent aliphatic radical, the compound being present in an amount sufficient to maintain the mud present in an oil well in a suspended and dispersed condition in the presence of strong acids.

2. The well treating process of claim 1, wherein said bivalent aromatic radical (A) comprises a bivalent naphthalene radical.

3. The well treating fluid of claim 1 wherein said compound comprises an alkali metal salt of the sulphonic acid.

4. The well treating fluid of claim 1 wherein the said divalent aliphatic hydrocarbon radical (R) consists of a methylene radical.

5. The method of treating oil wells which comprises dissolving the earthy substance by means of an acid capable of forming soluble compounds thereof while preventing the clogging of the pores of the earth formation with mud by the presence of a compound selected from the group consisting of the monovalent and the bivalent metal salts of a sulphonic acid having the formula

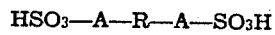

wherein A is a bivalent aromatic radical and R is a bivalent aliphatic radical.

6. The method of claim 5 wherein said sulphonic acid comprises a condensation product of formaldehyde and naphthalene sulphonic acid.

TROY J. STEWART.